United States Patent [19]

Fukuda et al.

[11] Patent Number: 4,731,674
[45] Date of Patent: Mar. 15, 1988

[54] COLOR VIDEO SIGNAL PROCESSING APPARATUS FOR CROSSTALK ELIMINATION

[75] Inventors: Tokuya Fukuda; Noriyuki Yamashita; Toshitaka Senuma; Isao Masuda, all of Tokyo, Japan

[73] Assignee: Sony Corporation, Tokyo, Japan

[21] Appl. No.: 798,613

[22] Filed: Nov. 15, 1985

[30] Foreign Application Priority Data

Nov. 19, 1984 [JP] Japan ................................ 59-244096

[51] Int. Cl.$^4$ ........................ H04N 9/79; H04N 5/782
[52] U.S. Cl. ..................................... 358/328; 358/329
[58] Field of Search ........................ 358/310, 328–329

[56] References Cited

U.S. PATENT DOCUMENTS 3,871,019 3/1975 Bingham ............................. 358/329
4,177,481 12/1979 Yamagiwa et al. ................. 358/320

FOREIGN PATENT DOCUMENTS

0145376 6/1985 European Pat. Off. .
2009562 6/1979 United Kingdom .

Primary Examiner—Robert L. Richardson
Attorney, Agent, or Firm—Lewis H. Eslinger; Alvin Sinderbrand

[57] ABSTRACT

Signal processing apparatus for processing a color video signal formed of a luminance signal and a color carrier signal reproduced from a magnetic tape, in which the signals include respective crosstalk components produced from the tracks adjacent the track being traced. The color video signal was originally recorded so that the crosstalk components are frequency interleaved relative to the signal in the track being reproduced, and signal processing apparatus permits the luminance and color carrier signals to be processed and the respective crosstalk components eliminated using only a single time delay element for both luminance and color carrier crosstalk components. The single delay unit is part of a comb filter and is particularly adapted for fabrication as a CCD element.

15 Claims, 8 Drawing Figures

COLOR VIDEO SIGNAL PROCESSING APPARATUS FOR CROSSTALK ELIMINATION

BACKGROUND OF THE INVENTION

1. Field of the Invention

This invention relates generally to a signal processor for processing a color video signal of the kind in which crosstalk components of a luminance signal and a color carrier signal from tracks adjacent the track being reproduced are frequency-interleaved relative to the respective luminance and color carrier signal in the track being reproduced and, more particularly, to a signal processor using a comb filter for removing these crosstalk components.

2. Description of the Background

Video tape recorders for recording and reproducing video signals of the kind using a half-inch magnetic tape are now well known for home use. Typically, when recording, the video signal is separated into luminance and color carrier signals and the color carrier signal is frequency down-converted to place it on the low side of the luminance signal in the frequency spectrum and by use of the so-called phase inversion technique or phase shift technique the frequency of the color carrier is further converted so that the crosstalk components from adjacent tracks have a frequency-interleaved relationship with the signal from the track being reproduced. This is intended to aid in crosstalk cancellation. The luminance signal has the DC level normally contained in the broadcast signal cancelled therefrom and is then frequency modulated and frequency shifted by ½ the horizontal frequency every other track, whereby the luminance crosstalk component from the adjacent tracks upon reproduction will have a frequency-interleaved relationship with the luminance signal in the track being reproduced. As in the case of the chrominance or color carrier signal, such frequency interleaving is intended to aid in eliminating the unwanted crosstalk components. This known approach typically requires two comb filters, each of which requires at least dedicated delay line, generally having a time delay of one horizontal scan, and the frequency-interleaved relationship means that during reproduction of the recorded color video signal such crosstalk components can be removed by using comb filters. A comb filter is well known and is a filter having an insertion loss that forms a sequence of narrow passbands, or narrow stopbands, that are centered at multiples of some specified frequency. In most generally known systems, in order to reproduce color video signals and to eliminate the crosstalk components from adjacent tracks at least two comb filters are required.

The unwanted crosstalk components can be removed using the known comb filters, however, time delay circuits of one horizontal scan time delay are very expensive to fabricate and are of a relatively large size compared with other circuit elements in the overall video signal processing assembly. Additionally, one comb filter is required for each of the luminance signal and the color carrier signal (chrominance), thereby exacerbating the problem by increasing the manufacturing costs and the increasing the space requirement for mounting the circuitry. Typically, individual delay lines are required in the recording circuitry for processing the signals for recording, however, if in place of a conventional delay line a charge coupled device (CCD) is used, which has a suitably broad frequency range to encompass both the luminance signal as well as the color carrier signal, then the time delay operations involved can be accomplished simultaneously. Nevertheless, upon reproduction regardless of the kind of time delay circuits employed, a separate, dedicated comb filter is necessary for the luminance signal and the color carrier signal.

Although there have been proposed systems to accomplish cancellation of the crosstalk components of the luminance and color carrier signal using only a single delay circuit, in order to carry out other signal processing operations, such as noise removal and cancellation and the like, it still remains necessary to utilize another comb filter to separate the luminance and chrominance signals.

OBJECTS AND SUMMARY OF THE INVENTION

Accordingly, it is an object of the present invention to provide apparatus for processing a color video signal that can eliminate the above-noted defects inherent in the prior art.

Another object of this invention is to provide a color video signal processing apparatus in which a single comb filter is used in common for both the luminance signal and the color carrier signal to cancel crosstalk components thereof that are produced upon playback.

A further object of this invention is to provide a color video signal processing apparatus in which two previously known time delay circuits can be replaced by a single time delay circuit, thereby reducing the size and cost and power consumption of the signal processing apparatus.

A still further object of this invention is to provide a color video signal processing apparatus in which noise cancellation processing for the luminance signal and identification processing for identifying the phase of the reproduced chrominance signal are not adversely affected by the signal processing apparatus that eliminates unwanted crosstalk components.

In accordance with an aspect of the present invention, a color video signal processing apparatus is provided for reproducing a color video signal that has been processed such that a luminance signal and a color carrier signal are arranged in frequency bands so as not to be superimposed one upon another and in which the crosstalk components of the luminance signal and color carrier signal from adjacent tracks are respectively frequency-interleaved relative to the main signal components of the track being reproduced. A filter network is provided to arrange the luminance signal and color carrier signal in respective frequency bands and then the luminance signal and color carrier signals are added in an adding circuit and delayed by one or two horizontal scan time periods. Another adding circuit adds the delayed output with the output from the first adding circuit and the resultant summed signal is fed through another filter, which provides an output luminance signal having the crosstalk components removed. A subtraction unit is provided to subtract the output of the delay circuit from the output of the first adding circuit, with the resultant difference signal being fed through a subsequent filter to obtain the color carrier signal, which has also had the crosstalk components removed therefrom.

The above and other objects, features, and advantages of the present invention will become apparent from the following detailed description of the illustrated embodiments thereof to be read in conjunction with the accompanying drawings, in which like reference numerals indicate like or similar circuit elements.

DETAILED DESCRIPTION OF PREFERRED EMBODIMENTS

Figure 1:
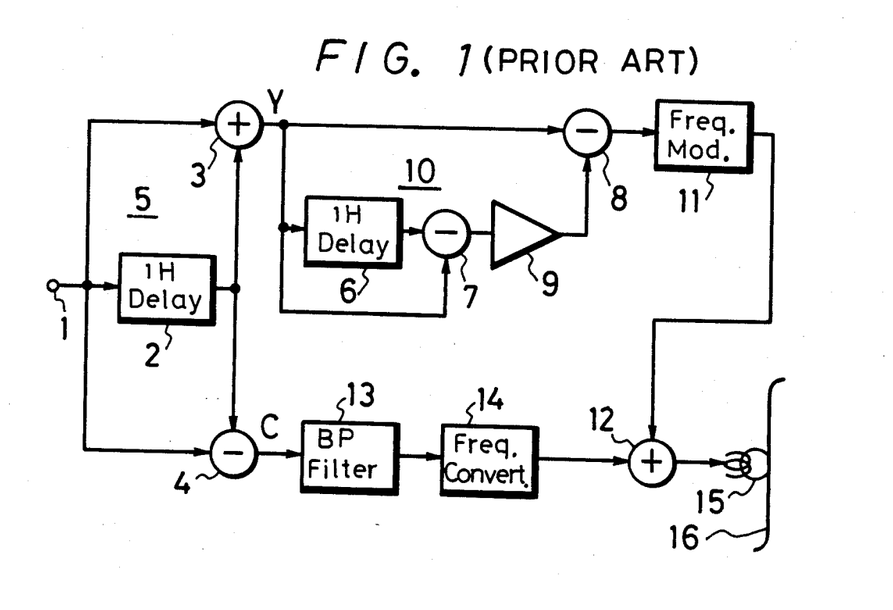
FIG. 1 is a schematic in block diagram form of a signal processing circuit for recording a color video signal, known in the prior art.

A known signal processing system in which color video signals are prepared for recording on a magnetic tape is shown generally in the block diagram of FIG. 1. In this signal processing system, a color video signal is fed in at input terminal 1 and is separated into its two principal components by a first comb filter shown generally at 5. Comb filter 5 includes a delay circuit 2 that receives the input color video signal and provides a time delay equal to one horizontal scan period (1H). The output of delay circuit 2 is fed both to an adder circuit 3 and subtractor circuit 4. Also fed to adder circuit 3 is the original color video signal input at terminal 1 and the resultant sum of these two signals at the output of adder 3 is the luminance signal component Y. Similarly, also fed to subtractor circuit 4 is the color video signal at input terminal 1, so that the resultant difference signal, through operation of comb filter 5, is the color carrier signal or carrier chrominance signal C. The luminance signal Y from adder 3 is fed to a second comb filter 10 that consists of a second time delay line 6, which has a time delay of one horizontal period (1H), a subtractor circuit 7, and a limiting amplifier 9. By subtracting a delayed luminance signal from a non-delayed luminance signal and passing the difference through limiter amplifier 9 to a subtractor circuit 8 that also has the luminance signal Y fed thereto, a DC level step or difference that is typically contained at every horizontal period in the broadcast color video signal is removed or cancelled. The luminance signal Y having the DC level difference cancelled therefrom at the output of subtractor 8 is fed to a frequency modulator 11 in which it is modulated such that the FM carrier frequency is shifted by $\frac{1}{2} f_H$, where $f_H$ is the horizontal scan frequency, at every other field, that is, at every other recorded track. Thus, by performing such frequency shifting the crosstalk components from the adjacent tracks that will be picked-up during reproduction will have a frequency-interleaved relationship relative to the luminance signal of the track being reproduced. The FM modulated (shifted) luminance signal produced by frequency modulator 11 is subsequently fed to an additional adder circuit 12.

The color carrier signal C, as produced by subtracting circuit 4 of first comb filter 5, is frequency band limited in bandpass filter 13 and fed to a frequency converter circuit 14, wherein it is frequency down-converted. An example of the frequency shift provided by frequency converter 14 is that if the color carrier frequency is 3.58 MHz, then the carrier frequency may be shifted down to approximately 688 KHz, thereby placing it below or on the low frequency side of the FM luminance signal. Frequency converter 14 can operate by either the so-called phase inversion (PI) system or phase shift (PS) system, whereby the crosstalk components from the tracks adjacent the track being reproduced will have a frequency-interleaved relationship relative to the color carrier signal from the track being traced by the head.

The frequency converted color carrier signal produced by frequency converter 14 is also fed to another input of adder 12, in which it is added to the FM luminance signal as produced by frequency modulator 11. The resultant summed signal (Y+C) is then fed to a rotary magnetic head 15 by which the signals are then recorded on a magnetic tape 16 using the so-called helical scan method at a rate of one slant track per field of the video signal. The so-called helical scan recording system typically provides that rotary head 15 includes two heads that are provided in opposing relationship to each other with an angular distance therebetween of 180°. The two heads are rotated at a one frame period rate, and magnetic tape 16 is wound around the peripheral surfaces of a drum and is transported in a predetermined direction at a selected speed. In this fashion the signals are recorded sequentially by each respective head as slanted tracks over the length of the magnetic tape.

Figure 2:
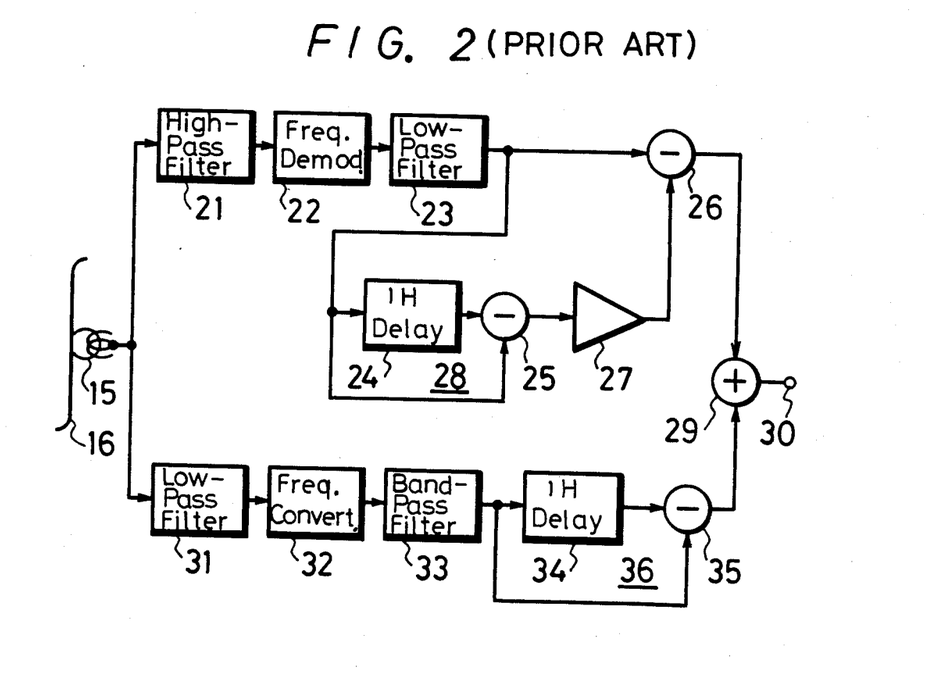
FIG. 2 is a schematic in block diagram form of a signal processing circuit for reproducing a color video signal, known in the prior art.

FIG. 2 shows a known signal processing system for use in reproducing signals that have been recorded on a magnetic tape using a system such as shown in FIG. 1. Specifically, magnetic head 15 is operated to reproduce signals recorded on magnetic tape 16, and the reproduced signal is fed to a high-pass filter 21 in order to derive the FM luminance signal. Similarly, the signal reproduced by rotary head 15 is also fed to a low-pass filter 31, from which the low-frequency converted color carrier signal is derived. The FM luminance signal, as separated by high-pass filter 21, is fed to a frequency demodulator 22 in which it is frequency demodulated and the output signal produced thereby is fed to a low-pass filter 23. Now, although the demodulated luminance signal will contain the crosstalk components from the tracks adjacent the main track being reproduced, such crosstalk components have a frequency-interleaved relationship relative to the main signal being reproduced. Therefore, as discussed above, the crosstalk component contained in the demodulated luminance signal as produced by low-pass filter 23 can be removed by a comb filter. More specifically, the comb filter 28 includes a delay circuit 24 providing a time delay of one horizontal scan period (1H) and two subtractor circuits 25, 26, as well as a limiter amplifier 27. This comb filter operates substantially identically to comb filter 10 in the circuit of FIG. 1 and in which limiter amplifier 27 is provided to suppress signal components in which there is no vertical correlation.

The low-frequency converted carrier signal is derived from the composite reproduced signal by a low-pass filter 31 and is reconverted to a signal having the original subcarrier frequency in frequency converter 32; in this example, the original subcarrier frequency was 3.58 MHz. The output of frequency converter 32 is fed through bandpass filter 33 and, thus, represents the original color carrier signal. This signal contains crosstalk components from the tracks adjacent to the track being reproduced, however, because such crosstalk components have the frequency-interleaved relationship relative to the main signal of interest being reproduced they can be removed by a comb filter, shown generally at 36. Comb filter 36 includes a time delay element 34, which provides a time delay of one horizontal scan period (1H), and a subtractor circuit 35. Comb filter 36 operates in keeping with the operation of the above-discussed comb filters, and the output of subtractor 35 is fed to an output signal adder 29 that has as its other input the output of subtractor circuit 26, which is part of comb filter 28. Thus, the color carrier signal C from which all crosstalk components have been removed and the luminance signal Y from which all crosstalk components have also been removed are added together in adder 29 and the summed signal is made available at output terminal 30.

The above examples shown in FIGS. 1 and 2 relate to the NTSC system and, thus, the delay times given for the various delay lines, for example, delay lines 6, 24, and 34 would necessarily have a different time delay for the PAL system, more particularly, they would have a time delay of two horizontal periods (2H).

Although the system described relative to FIGS. 1 and 2 operate to process the signal sufficiently to eliminate the crosstalk components, the delay line circuits used in constructing the comb filters are very expensive and, moreover, have a relatively large size as compared with the other circuit elements in the system. Additionally, in the reproducing circuit a separate comb filter is necessary for both the luminance signal and the color carrier signal and, thus, the problems presented by the delay lines are only made more acute. In the recording system, however, it is possible to employ as a delay line a delay circuit formed of a charge coupled device (CCD), which can have a broad enough frequency range to cover both the luminance signal and the color carrier signal and, therefore, a CCD may be utilized as delay circuits 2 and 6 in comb filters 5 and 10, respectively, in the prior art system of FIG. 1. This CCD would eliminate one of the conventional delay line units and permit the separation of the luminance signal and the color carrier signal and the cancellation of the DC difference voltage to be accomplished substantially simultaneously. Nevertheless, in the signal processor system used to reproduce color video signals shown in FIG. 2, the luminance signal and color carrier signal crosstalk components must be cancelled separately, so that a dedicated comb filter is necessary for each of the respective systems, thus, requiring two individual delay circuits for providing the 1H period delay.

Figure 3:
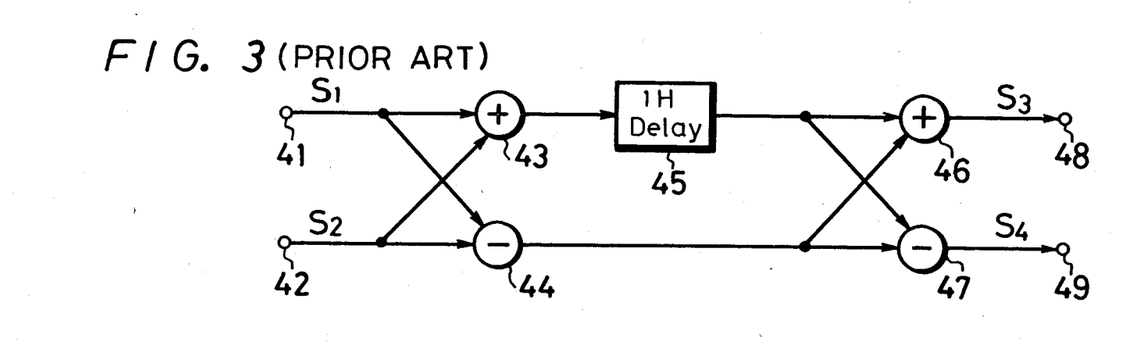
FIG. 3 is a schematic diagram of a portion of a color video signal processing apparatus using a single delay line, known in the prior art.

Because of the disadvantages relating to the cost and size of the equipment afforded by the circuits of FIGS. 1 and 2, there has been recently proposed a system attempting to utilize only a single delay circuit and such system is disclosed in published Japanese patent application No. 55-82583. A portion of the circuit proposed in this Japanese application is shown in FIG. 3 in which a single 1H delay circuit is used in the reproduction operation to remove the crosstalk components of the luminance signal and carrier chrominance signal simultaneously. The circuit of FIG. 3 is constructed so that if a signal S1 is applied to an input terminal 41 and a signal S2 is applied to an input terminal 42 both signals will be fed to an adder circuit 43 and also to a subtractor circuit 44. The output of adder circuit 43 is fed through a 1H delay line 45 to a second adder circuit 46 and to a subtractor circuit 47. Adder circuit 46 and subtractor 47 have as their respective second inputs the output of first subtractor circuit 44. In operation of this circuit, an output signal $S_3$ is derived from the output of adder circuit 46 and made available at output terminal 48, and an output signal $S_4$ is derived from the output of subtractor circuit 47 and made available at output terminal 49.

In using the circuit of FIG. 3 in a recording operation, a color video signal is fed in at input terminal 41 and input terminal 42 is left open, whereby the luminance signal Y is separated and produced as output signal $S_3$ of adder circuit 46 and the color carrier signal C is separated and produced as output signal $S_4$ of subtractor circuit 47. During the reproduction operation using the circuit of FIG. 3, the reproduced and frequency-demodulated luminance signal Y is fed in as input signal $S_1$ to terminal 41, and the color carrier signal C, which has been frequency converted and returned to its original form, is fed in at terminal 42 as input signal $S_2$. Thus, a summed output signal of the luminance signal Y and the color carrier signal C is provided as output signal $S_3$, whereas output signal $S_4$ is provided as a signal that results from adding the crosstalk component of the luminance signal and the crosstalk component of the color carrier signal. These two crosstalk components are seen to cancel and only output signal $S_3$ is produced at output terminal 48.

Accordingly, it is seen from the operation of the known circuit of FIG. 3 that the crosstalk components of the luminance signal and carrier chrominance signal, or color carrier signal, can be cancelled using only a single delay circuit. Nevertheless, in the circuit shown for example in FIG. 3, because the output signal is obtained in the form of the luminance signal and the color carrier signal being added together, this requires a further separation operation to be performed if various other signal processing operations are to be accomplished. For example, in order to carry out the noise removing process on the luminance signal, the luminance signal and color carrier signal must be separated again by use of a comb filter, even if the process to return the phase of the color carrier using the phase inverted or phase shifted technique were correctly carried out.

Figure 4:
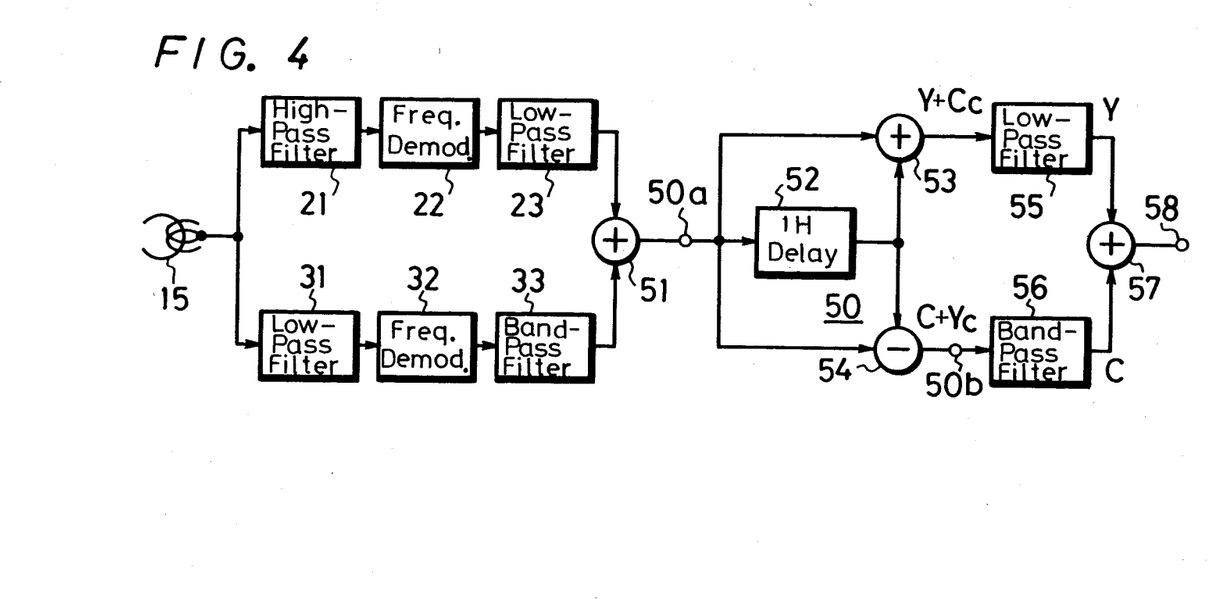
FIG. 4 is a schematic in block diagram form an embodiment of a color video signal processing apparatus according to the present invention for use in reproducing color video signals.

Accordingly, all of the known signal processing systems have drawbacks relating to the requirement for comb filters and the delay lines necessarily used therein. The present invention operates to eliminate such drawbacks by providing a signal processing apparatus in which after a reproduced luminance signal and a reproduced color carrier signal have been added together, the summed signal is supplied to a single comb filter and all crosstalk components of the respective signals are cancelled. An embodiment of the present invention is shown in FIG. 4, in which circuit elements that are substantially identical to those described above have the same reference numerals. Thus, in the reproducing system of FIG. 4 the head end filters and demodulators and the like are substantially the same as those shown in FIG. 2, for example.

In the embodiment of FIG. 4, the reproduced luminance signal from low-pass filter 23 and the reproduced color carrier signal from bandpass filter 33 are fed to respective inputs of an adder circuit 51. The output of adder circuit 51 is fed to a comb filter 50 through a comb filter input terminal 50a. Comb filter 50 includes a delay circuit 52 providing a time delay of 1H, an adder circuit 53, and a subtractor circuit 54. Once again, it is noted that if the signal processing apparatus is for use with a PAL video system the delay time provided by the delay circuit 52 would be equal to 2H. Additionally, delay circuit 52 can be constructed as a CCD or the like such that the entire frequency range of both portions of the color video signal can be passed therethrough. Now, when the output of adder circuit 51 and the output of delay circuit 52 are added in adder circuit 53, the crosstalk component Yc of the luminance signal Y will be cancelled, and the color carrier signal C will be cancelled thereby producing the summed output signal (Y+Cc) consisting of the luminance signal Y and a crosstalk component Cc of the color carrier signal C at the output of adder circuit 53. Similarly, when the output of adder circuit 51 is fed to subtractor circuit 54 and the delayed composite signal produced by delay circuit 52 is fed to the other input of subtractor circuit 51, the crosstalk component Cc of the color carrier singal C will be cancelled, as will be the luminance signal Y. The result is that the output of subtractor circuit 54 is a signal comprising a sum (C+Yc) of the color carrier signal and the crosstalk component of the luminance signal. Because it is known that the crosstalk component Cc of the color carrier signal occupies a frequency band higher than that of the luminance signal Y, the output from adder circuit 53 is fed through a low-pass filter 55, thereby to remove the unwanted color carrier crosstalk signal Cc and to produce the luminance signal Y fed to an adder circuit 57. Similarly, because it is known that the luminance crosstalk component $Y_c$ occupies a different frequency band than that of the color carrier signal C, the output from subtractor circuit 54 may be fed through output terminal 50b and a bandpass filter 56, whereby the color carrier signal C is fed to the other input of adder circuit 57 in which it is added with luminance signal Y and provided as a composite signal at a system output terminal 58.

Figure 5:
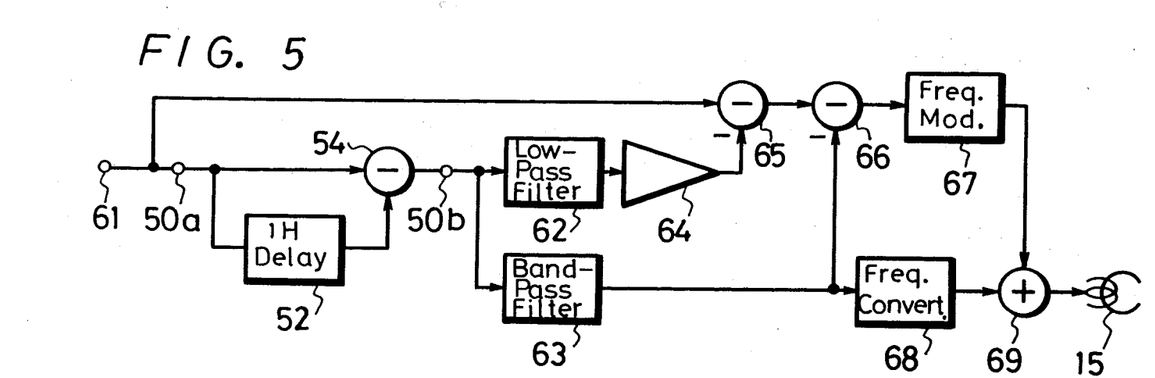
FIG. 5. is a schematic in block diagram form of an embodiment of a color video signal processing apparatus according to the present invention for use in recording color video signals.

The comb filter arrangement as taught by the present invention in the embodiment of FIG. 4 may also be employed in a recording mode, and FIG. 5 shows an embodiment to accomplish that end. Specifically, a color video signal is applied at input terminal 61 that is connected to an input terminal 50a corresponding to comb filter input terminal 50a of FIG. 4. The input signal is fed to a time delay circuit 52 and to an input of a subtractor circuit 54, and the delayed signal is fed to another input of subtractor circuit 54. This removes the luminance component Y so that at the output of subtractor 54 is derived the color carrier signal C, which includes a non-correlated component of the luminance signal, that is, the DC step or difference component. The output of subtractor circuit 54 is provided through output terminal 50b to low-pass filter 62, which operates to separate the DC difference component of the luminance signal, that is, it serves to block the high-frequency color carrier signal. Additionally, the output from subtractor circuit 54 is also fed through terminal 50b to bandpass filter 63, which separates the color carrier signal C from the input signal fed thereto.

Now, the DC difference component of the luminance signal passed through low-pass filter 62 is fed through a limiter amplifier 64 to the positive input of a subtractor circuit 65, which has at its subtraction input the input video signal provided at input terminal 61. Subtractor circuit 65 subtracts this DC difference component from the input signal, and the output of subtractor circuit 65 is fed to the positive input of subtractor circuit 66 that has at its subtraction input the color carrier signal from bandpass filter 63, whereby a luminance signal is produced having the color difference component cancelled therefrom at the output of subtractor circuit 66. This luminance signal is subsequently frequency modulated or frequency shifted as in the circuit of FIG. 1 in a frequency modulator 67 and provided as one input to adder circuit 69. The color carrier signal output from bandpass filter 63 is also fed to a frequency converter 68, in which it is down converted to a lower frequency, converted using the phase shift or phase inversion technique as described above, and is then provided at another input of adder 69. Thus, this low frequency converted color carrier signal is added with the FM luminance signal and the summed output is then supplied to the rotary head 15 for recording on the magnetic tape (not shown) in a manner so that crosstalk components from tracks adjacent a track being reproduced will have a frequency-interleaved relationship with their respective signals in the track being reproduced.

When operating between recording and reproducing, if the terminals 50a and 50b of the comb filter are switched to the recording system and reproducing system, respectively, by a recording/reproducing changeover switch (not shown) then all signal processing can be performed using only a single delay circuit for both recording and reproducing.

Figure 6:
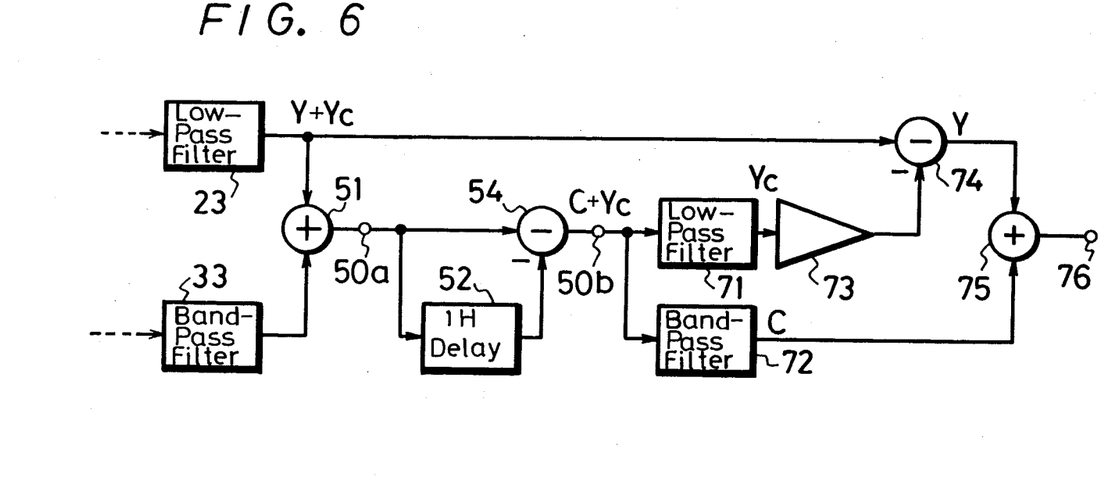
FIG. 6 is a schematic in block diagram form of another embodiment of a color video signal processing apparatus according to the present invention for use in reproducing color video signals.

Another embodiment of the present invention for use in a reproducing system is shown in FIG. 6, in which the input signals are derived from low-pass filter 23 and bandpass filter 33, as shown for example in the embodiment of FIG. 4. More specifically, the embodiment of FIG. 6 further includes a portion of the comb filter consisting of delay circuit 52 and subtractor circuit 54, and input terminal 50a and output terminal 50b show the location in the circuit of these elements. The summed signal made up of the color carrier signal C and the crosstalk component Yc of the luminance signal that was present at output terminal 50b in the embodiment of FIG. 4 will likewise be available at that terminal in the embodiment of FIG. 6. This summed signal is then fed to a low-pass filter 71 and also to a bandpass filter 72. In low-pass filter 71 only the crosstalk component Yc of the luminance signal will be passed because the color carrier signal is of a higher frequency and, similarly, bandpass filter 72 operates to pass only the color carrier signal and to block the luminance crosstalk component Yc. The luminance crosstalk component Yc obtained from low-pass filter 71 is fed through limiter amplifier 73 to the subtraction input of subtractor circuit 74 and fed to the other input of subtractor circuit 74 is the composite luminance signal including the crosstalk component. Therefore, the output of subtractor circuit 74 represents only the luminance component Y with the crosstalk component having been cancelled therefrom. Additionally, the color carrier signal crosstalk component Cc has already been deleted by use of the portion of the comb filter, and the output of bandpass filter 72 consists of only the color carrier signal C, which is fed to adder circuit 75 along with the luminance signal from subtractor circuit 74. Adder circuit 75 sums the two input signals with the resultant signal having no crosstalk components and being made available at system output terminal 76.

Figure 7:
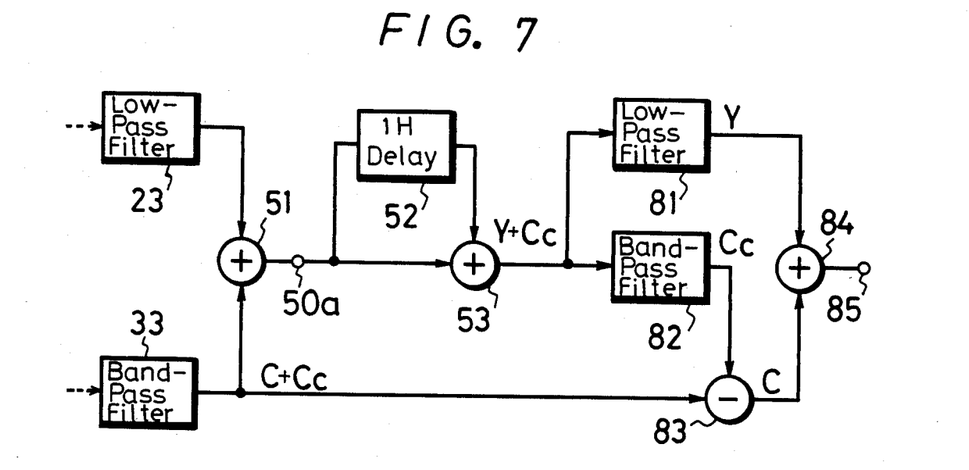
FIG. 7 is a schematic in block diagram form of still another embodiment of a color video signal processing apparatus according to the present invention for use in reproducing color video signals.

Another embodiment of the present invention in which signals may be reproduced without unwanted crosstalk components is shown in FIG. 7. Only a portion of the comb filter is employed in this embodiment and such portion consists of input terminal 50a, delay line 52, and adder circuit 53. Once again, the input signals are obtained through low-pass filter 23 and bandpass filter 33, both producing output signals fed to the respective inputs of adder circuit 51. The portion of the comb filter employed in the embodiment operates just as in the above-described embodiments and adder circuit 53 has fed thereto the combined input signals from low-pass filter 23 and bandpass filter 33, as well as that same signal having been delayed by one horizontal period. The output signal of adder circuit 53 is a sum signal (Y+Cc) formed of the luminance signal Y and the crosstalk component Cc of the carrier chrominance signal. This summed signal is fed to a low-pass filter 81 that removes the color carrier crosstalk component Cc and leaves only the luminance signal Y at the output. The output summed signal from adder circuit 53 is also fed to a bandpass filter 82 that has a selected pass band to eliminate the luminance signal Y and to pass only the color carrier crosstalk component Cc. The crosstalk component $C_c$ of the color carrier signal is then fed to an input of a subtractor circuit 83 in which it is subtracted from the color carrier signal C that includes the cross talk component Cc produced by bandpass filter 33, so that the output of subtractor 83 is simply the color carrier signal C that is then fed to an output adder circuit 84. The other input to adder circuit 84 is the luminance signal having been obtained through low-pass filter 81, and then the combined luminance and color carrier signal is made available at output terminal 85. As seen in the embodiment of FIG. 7, it is possible to remove both crosstalk components of the luminance signal and the carrier chrominance signal, or color carrier signal, by the use of a single 1H delay circuit utilized simultaneously with both signals.

Figure 8:
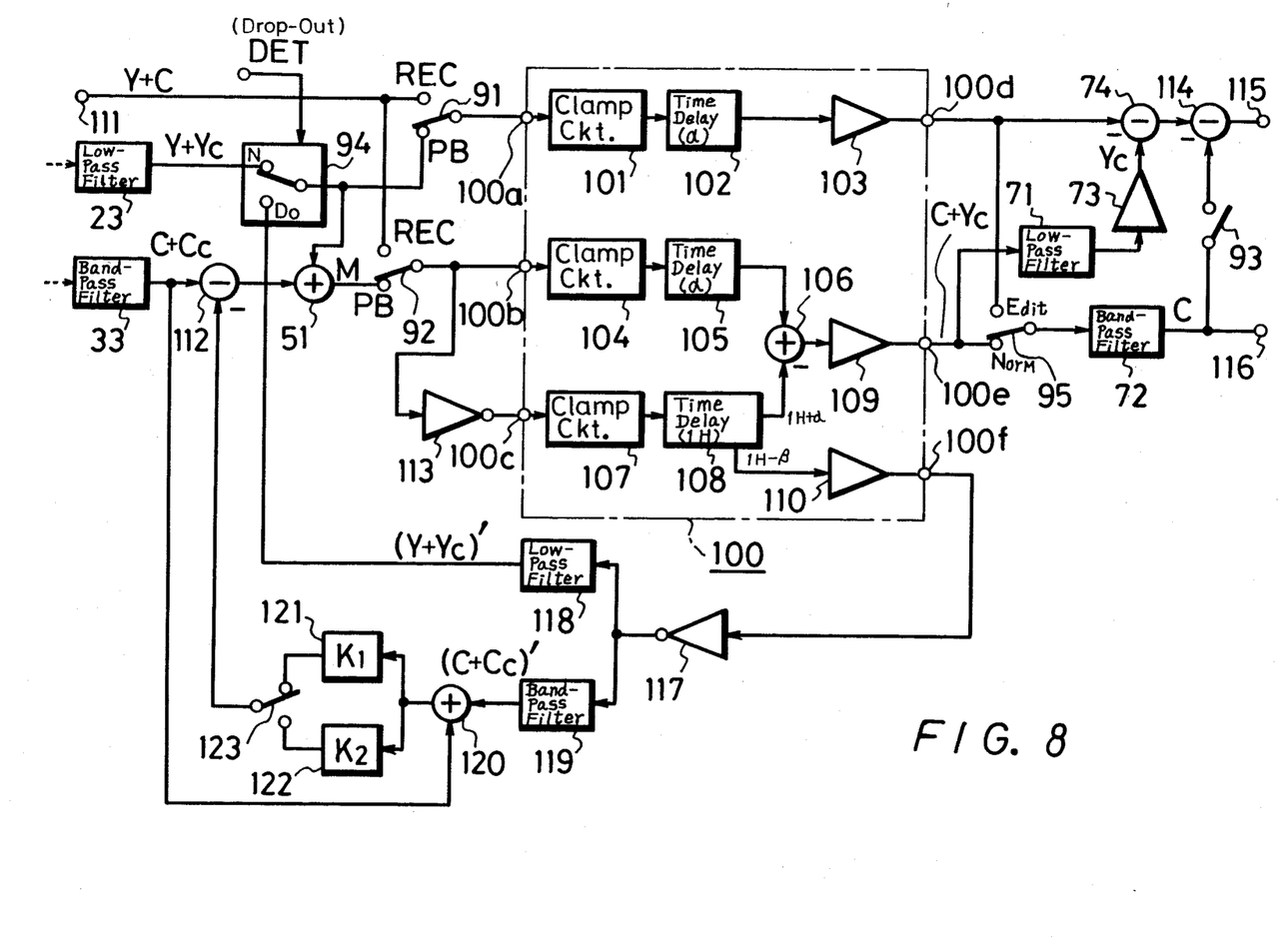
FIG. 8 is a schematic in block form showing the system of FIG. 6 in more detail.

The above-described embodiments have been intended as general teachings of the basic concepts of the present invention and, of course, might utilize additional elements in order to comprise a commercially viable circuit. FIG. 8 is a block diagram showing these additional circuit elements that would be typically employed in a more production-oriented circuit and, particularly, the embodiment of FIG. 8 employs the concepts taught in the embodiment shown in FIG. 6 hereinabove. In the embodiment of FIG. 8, the 1H delay circuit of the comb filter is further employed as a delay circuit in a drop-out compensating circuit. Furthermore, the comb filter is also employed as a feed-back type comb filter in order to enhance the crosstalk removing effects. The embodiment of FIG. 8 is particularly suitable for using a CCD as the delay circuit.

The circuit of FIG. 8 is intended for use in both recording and reproducing and switches 91, 92, and 93 may be changed over depending upon selecting either the recording or reproducing mode. More specifically, the moveable contact arms of switches 91 and 92 are set to the respective REC terminals in the recording mode and are set to terminals PB in the playback or reproduction mode. Switch 93, on the other hand, is intended to be closed in the recording mode and to be open during the playback or reproducing mode. A drop-out compensating switch circuit 94 is provided in which the moveable contact arm thereof is connected to input terminal DO by action of a drop-out detection signal DET fed thereto when a drop out is detected by conventional drop-out detection circuitry. On the other hand, the moveable contact arm of switch circuit 94 will be normally connected to contact N for processing the signals in the normal fashion as described hereinbelow. The comb filter 100 contains circuit elements shown within the dot and dashed lines and advantageously employs a CCD element as the delay circuitry. In order to match the gains of and the frequency characteristics of the luminance signal system with the color carrier signal system during the playback or reproduction mode, comb filter 100 includes not only that portion of the comb filter as represented between input terminal 50a and output terminal 50b of the embodiment of FIG. 6 but also includes the signal path from low-pass filter 23 to subtractor circuit 74 in the embodiment of FIG. 6. Thus, during playback, the luminance signal Y that includes the crosstalk component Yc produced by low-pass filter 23 is fed through the drop-out switch 94 in its normal position N and through switch 91 in the playback position PB to input terminal 100a of comb filter 100. The signal input at terminal 100a is fed through a clamping circuit 101 and a delay circuit 102. The time delay circuit 102 is provided with a delay amount designated as representing from one to two pulses of the clocking signal used to drive the CCD element. The reason that delay unit 102 is required is set forth hereinafter. The signal is then fed to a low-pass filter 103 to remove any high-frequency components, with the output thereof being fed to one output terminal 100d of comb filter 100. Thus, it is seen that no steps are taken to remove the luminance crosstalk component in this signal path between terminals 100a and 100d and, thus, during playback the signal available at output terminal 100d is the luminance signal Y containing the crosstalk component Yc.

Similarly, the color carrier signal C that includes the crosstalk component Cc produced by bandpass filter 33 is fed through a subtractor circuit 112, which forms a portion of the feedback-type comb filter whose operation will be described hereinbelow, to adder circuit 51 in which it is added with the input luminance signal and its cross talk component as passed by switch 94. The output of adder circuit 51 is a summed signal M fed through switch 92 to another input terminal 100b of comb filter 100. The summed signal $\overline{M}$ is also fed through an inverter circuit 113 to still another input 100c of comb filter 100 and although a subtractor circuit would be typically employed inverter 113 is used because such subtractor circuits are difficult to form in a CCD comb filter, which is used as comb filter 100 in this embodiment.

The summed signal M at input terminal 100b is fed through clamping circuit 104 and through another delay circuit 105 having a delay amount of α, similar to circuit 102, to one input of adder circuit 106. The output of inverter 113 is an inverted summed signal M fed to another input terminal 100c and through a clamping circuit 107 to a time delay circuit 108. Time delay circuit 108 provides approximately a 1H time delay and the output signal therefrom is fed to another input of adder circuit 106. Accordingly, the output of adder 106 represents the 1H delayed signal from circuit 108 having been subtracted from the summed signal M, so that the output is the color carrier signal C including the crosstalk component of the luminance signal Yc. By inverting summed signal M an effective subtraction operation is performed by adder 106, thus, the minus signal at the inverted input. The resultant signal from adder circuit 106 is then fed through a low-pass filter 109 to remove any undesirable high-frequency components and is available at an output terminal 100e of comb filter 100.

Delay circuits 102 and 105 are also formed as CCD elements and are provided to give the signals from input terminals 100a and 100b the changes in frequency characteristics and gain which are provided by the CCD delay circuit 108 (1H+α) to the signal input at terminal 100c.

The delay provided by time delay unit 108 is not exactly one horizonal period but is selected to be one horizontal period plus a delay amount of α, which is about one to two pulses of the CCD clocking signal to provide the necessary gain and frequency characteristic adjustments.

Because the embodiment of FIG. 8 is an elaboration upon the basic embodiment of FIG. 6, during the playback or reproduction mode the luminance crosstalk component Yc is separated from the output signal (C+Yc) at output terminal 100e by low-pass filter 71. This luminance crosstalk component Yc is then fed through limiter amplifier 73 to a subtractive input of subtracting circuit 74, which receives at the other input the composite luminance signal consisting of the main luminance signal Y and the crosstalk component Yc, whereby the crosstalk component is cancelled in subtractor 74 and the luminance signal Y is fed to subtract through an output subtractor circuit 114 to a luminance output terminal 115.

The output signal (C+Yc) at output terminal 100e is also fed through a switch 95 in the normal position N to band pass filter 72 that removes the luminance crosstalk component Yc and produces the color carrier signal C at chrominance output terminal 116.

Time delay unit 108 also produces an output signal representing the inverted signal M having been delayed by the appropriate (1H) time period that is fed through a low-pass filter 100 to another output terminal 100f of comb filter 100. This delayed inverted signal at output terminal 100f is fed through an additional inverter 117 and a low-pass filter 118 to a bandpass filter 119. The output signal of low-pass filter 118, which operates to remove the color carrier signal and its cross-talk components is the luminance signal and its cross talk component (Y +Yc)'0 that has been delayed through action of time delay unit 108 and is fed to input terminal DO of drop-out switch 94. Therefore, when a drop-out has been detected by the conventional circuitry, and the signal DET operates the moveable contact arm of switch 94 to the DO terminal, in place of the then present luminance signal (Y+Yc) produced by low-pass filter 23, the previous luminance signal (Y+Yc)' that has now been delayed by one horizontal scan period is produced at the output of switch 94, thereby compensating the detected dropout by replacing it with an adjacent signal.

Bandpass filter 119 operates to remove the luminance signal and its crosstalk components and produces a signal representing the color carrier C and the color carrier crosstalk component Cc that has been delayed by time delay unit 108 and this delayed signal (C+Cc)' is fed to an adder circuit 120 that has as its other input the color carrier signal C including the crosstalk component Cc originally separated from the reproduced color video signal by bandpass filter 33. This composite signal produced by adder 120 is then supplied through two attenuators 121 and 122 providing different levels of attenuation to respective fixed terminals of a switch 123. Depending upon the degree of attenuation that has been selected by operation of the moveable contact of arm of switch 23, the attentuated signal is fed from switch 123 to subtractor circuit 112 in which it is subtracted from the composite output signal of bandpass filter 33. In this fashion the feedback comb filter is formed.

Figure 9:
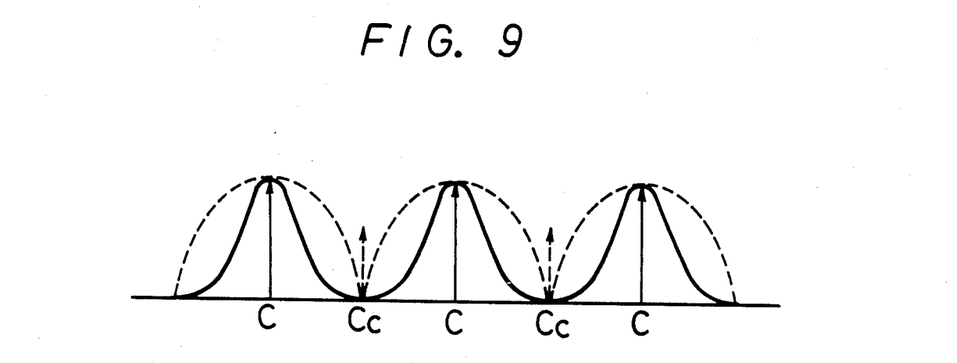
FIG. 9 is a waveform diagram representing the characteristics of a comb filter employed in the present invention.

The transfer characteristics of this type of feedback comb filter are represented generally in FIG. 9, in which the solid line represents the operation of the feedback comb filter, whereas the dashed line represents the transfer characteristics of a standard or conventional comb filter. It is seen from the waveforms of FIG. 9 that the feedback comb filter has a much steeper slope in comparison with the conventional comb filter.

Referring again to FIG. 8, because low-pass filter 118 and bandpass filter 119 both impart a finite time delay to signals passed therethrough, the delay circuit 108 is designed to provide a signal that has been delayed by $1H-\beta$ to output terminal 100f, where is the time delay imparted to a signal by low-pass filter 118 or bandpass filter 119. This time delay $(1H-\beta)$, which is less than the one scan period, thereby takes the delay time introduced by low-pass filter 118 or bandpass filter 119 into consideration.

In the recording mode, the color video signal comprising the sum of the luminance and color carrier signals (Y+C) as applied to input 111 is fed through switch 91 having been set to the REC mode to input terminal 100a of comb filter 100 and is also fed through switch 92, having been set to the REC mode, to input terminal 100b and through inverter 113 to input terminal 100c of comb filter 100. Thus, when recording, the sum signal of the luminance and color carrier signal is available at output terminal 100d of comb filter 100 and adder circuit 106 produces the color carrier signal C and the non-correlated component of the luminance signal Y, that is, the DC difference component available at output 100e. The DC difference component is derived by low-pass filter 71 and is fed through limiter amplifier 73 to subtractor circuit 74, in which the DC difference component in the luminance signal as contained in the input color video signal is subtracted from that input signal and the resultant difference signal fed through subtractor 114 to output terminal 115. Similarly, the chrominance signal from which the DC difference component has been removed is derived from bandpass filter 72 and fed to output terminal 116.

As described above, switch 93 is closed in the recording mode, therefore, the color carrier signal C is fed through switch 93 to subtractor circuit 114, so that only the luminance signal Y is present at output terminal 115. In this fashion, the luminance signal Y with the DC difference component having been removed is derived from subtractor 114, and the color carrier signal C is available at output terminal 116.

Switch 95 is connected to terminal N in the normal mode, however, the movable contact arm thereof can be moved to the edit terminal during an edit recording mode, in which switch 95 by-passes the effects of comb filter 100 so that the output signals at output terminals 115 and 116 are simply the input signals having been passed through the clamp circuit 101, the time delay 102, and the low-pass filter 103, with no comb filter effects having been provided. This straight-through connection is desirable in the editing mode in order to reduce as much as possible any signal deterioration that might be caused by the passage of the signal through the comb filter.

Thus, according to the present invention, because the reproduced luminance and reproduced color carrier signal are limited in respective frequency bands so as not to overlap the respective frequency spectrums, and because the luminance signal and color carrier signal are passed through the delay circuits in their summed or composite form, the same functions and effects that were previously achieved by using two delay circuits can be achieved by only a single delay circuit, therefore, resulting in signal processing apparatus being formed of a small size and having reduced power consumption and a low production cost.

Additionally, following the teaching of the present invention because the reproduced luminance signal and the reproduced color carrier signal are produced separately, unlike the known prior art example shown in FIG. 3, the apparatus according to the present invention eliminates the defects inherent in that known approach. Therefore, the signal processing apparatus can carry out noise cancelling processing for the luminance signal and identification processing necessary to identify the phase of the burst signal in the reproduced chrominance signal.

The above description is provided for various preferred embodiments of the invention, however, it will be apparent that many modifications and variations could be effected by one skilled in the art without departing from the spirit or scope of the novel concepts of the invention, which should be determined only by the appended claims.

What is claimed is:

1. Signal processing apparatus for a reproduced color video signal formed of a luminance signal and a color carrier signal and each including respective crosstalk components, in which the luminance and color carrier signals are in non-coextensive frequency bands and the respective crosstalk components are frequency-interleaved relative to the respective reproduced luminance and color carrier signals, the apparatus comprising:

first filter means receiving the reproduced color video signal for producing a frequency-band limited, reproduced color carrier signal and a frequency-band limited, reproduced luminance signal;

first signal combining means receiving said frequency-band limited, reproduced color carrier signal and said frequency-band limited, reproduced luminance signal for producing a summed output signal therefrom;

delay means receiving said summed output signal for producing a delayed output signal therefrom being time delayed by an integral multiple of a video horizontal scan time;

second signal combining means receiving at respective first and second inputs said summed output signal and said delayed output signal for producing a first output signal formed of the sum thereof and consisting of a luminance signal and a crosstalk component of said color carrier signal and a second output signal formed of the difference thereof and consisting of a color carrier signal and a crosstalk component of said luminance signal; and second filter means receiving said first and second output signals from said second signal combining means for producing said luminance signal having said crosstalk component of said color carrier signal removed and said chrominance signal having said crosstalk component of said luminance signal removed.

2. Signal processing apparatus according to claim 1, in which said first filter means includes a low-pass filter for passing only said color carrier signal and said color carrier signal crosstalk component.

3. Signal processing apparatus according to claim 1, in which said first filter means includes bandpass filter for passing only said luminance signal and said luminance singal crosstalk component.

4. Signal processing apparatus according to claim 1, in which said delay means comprises a single time delay circuit for delaying said said summed output signal for a period equal to one horizontal scan time of said color video signal.

5. Signal processing apparatus according to claim 1, in which second signal combining means comprises a signal adding circuit for adding said summed output signal and said delayed output signal and producing therefrom a luminance signal including said color carrier crosstalk component and a signal subtracting circuit for subtracting said delayed output signal from said summed output signal and producing therefrom said color carrier signal including said luminance crosstalk component.

6. Signal processing apparatus according to claim 5, in which said second filter means comprises a low-pass filter receiving said first output from said second signal combining means and producing said luminance signal therefrom and a bandpass filter receiving said second output signal from said second signal combining means for producing therefrom said chrominance signal and further comprising third signal combining means receiving said luminance signal and said chrominance signal from said low-pass filter and said bandpass filter, respectively, and producing output signal therefrom.

7. A color video signal processing apparatus for processing a signal reproduced from tracks on a magnetic tape, in which the reproduced signal includes luminance and chrominance signals having non-overlapping frequency bands and each including respective crosstalk components from tracks adjacent a track on said magnetic tape being reproduced and in which the crosstalk components are frequency interleaved relative to a color video signal from a track being reproduced, the apparatus comprising;

first filter means receiving the reproduced color video signal for producing a frequency-band limited color carrier signal and a color carrier crosstalk component and a frequency-band limited luminance signal and a luminance crosstalk component;

a signal adder circuit receiving said frequency-band limited color carrier signal and said frequency-band limited luminance signal for producing an added output signal therefrom;

delay means receiving said added output signal for producing a delayed output signal having a time delay based on an integral multiple of a horizontal scan time of said color video signal;

a first signal subtracting means receiving said added output signal and said delayed output signal for subtracting said delayed output signal from said added output signal and producing a difference signal therefrom;

second filter means receiving said difference signal and producing therefrom a luminance crosstalk component and a color carrier signal;

a second signal subtracting means receiving said luminance signal and said luminance crosstalk component from said first filter means and said luminance crosstalk component from said second filter means for subtracting said luminance crosstalk component therefrom and producing said luminance signal.

8. A color video signal processing apparatus according to claim 7, in which said first filter means includes a low-pass filter for passing only said color carrier signal and said color carrier crosstalk component.

9. A color video signal processing apparatus according to claim 7, in which said first filter means includes a bandpass filter for passing only said luminance signal and said luminance crosstalk component.

10. A color video signal processing apparatus according to claim 7, in which said delay means comprises a single time delay circuit for delaying said added output circuit by a time period equal to one horizontal scan time of said color video signal.

11. Apparatus according to claim 7, in which said second filter means comprises a low-pass filter and a bandpass filter and further comprising a second signal adder circuit for adding an output of said bandpass filter and an output of said second subtracting circuit means for producing a composite output signal therefrom.

12. A signal processing apparatus for processing a reproduced color video signal formed of a luminance signal including a luminance crosstalk component and a color carrier signal including a color carrier crosstalk component, in which the luminance and color carrier signals are in non-overlapping frequency bands and the respective crosstalk components are in frequency interleaved relationship relative to respective luminance and color carrier signals in a reproduced color video signal, the apparatus comprising;

first filter means receiving a reproduced color video signal for producing a frequency-band limited color carrier signal and a frequency-band limited luminance signal each including respective crosstalk components;

a first signal combining means receiving said frequency-band limited color carrier signal and said frequency-band limited luminance signal and said respective crosstalk components for producing a summed output signal therefrom;

delay means receiving said summed output signal for producing a delayed output signal having a time delay determined by an integral multiple of a horizontal scan time of the color video signal;

a signal adder circuit connected to receive said summed output signal and said delayed output signal for producing an added output signal of said luminance signal and a color carrier crosstalk component;

second filter means receiving said luminance signal and said color carrier crosstalk component from said signal adder circuit for separating said two signals and producing a luminance signal and a color carrier crosstalk component signal; and a signal subtracting circuit connected to receive said color carrier crosstalk component from said second filter means and said color carrier signal including color carrier crosstalk component from said first filter means and producing therefrom said color carrier signal without said crosstalk component.

13. Signal processing apparatus according to claim 12, in which said first filter means includes a low-pass filter for passing only said color carrier signal and a color carrier crosstalk component, and a bandpass filter for passing said luminance signal and a luminance crosstalk component thereof.

14. Signal processing apparatus according to claim 12, in which said delay means comprises a single time circuit providing a time delay equal to one horizontal scan period of said color video signal.

15. Signal processing apparatus according to claim 12, in which said second filter means comprises a low-pass filter receiving said added output signal from said signal adder circuit and producing therefrom said luminance signal, and a bandpass filter receiving said added output signal from said signal adder circuit and producing therefrom said color carrier crosstalk component, and further comprising a second signal adder circuit receiving said luminance signal from low-pass filter and said chrominance signal from said signal subtracting circuit for producing a summed output signal therefrom.

* * * * *